(12) United States Patent
Suganuma et al.

(10) Patent No.: US 6,503,550 B1
(45) Date of Patent: Jan. 7, 2003

(54) METHOD FOR CONTROLLING THE TEMPERATURE OF EDIBLE DOUGH DURING KNEADING STEP

(75) Inventors: Takao Suganuma, Kawasaki (JP); Yasunobu Hasegawa, Shimada (JP); Kiyoshi Usami, Shimada (JP); Akisato Tsukada, Kawasaki (JP); Takahiro Kuratani, Kawasaki (JP); Kazutaka Takahashi, Kawasaki (JP)

(73) Assignee: Ajinomoto Co., Inc., Tokyo (JP)

( * ) Notice: Subject to any disclaimer, the term of this patent is extended or adjusted under 35 U.S.C. 154(b) by 102 days.

(21) Appl. No.: 09/694,001

(22) Filed: Oct. 23, 2000

(30) Foreign Application Priority Data

Oct. 28, 1999 (JP) .......................................... 11-306190

(51) Int. Cl.[7] ................................................ A21D 6/00
(52) U.S. Cl. ...................................... 426/519; 426/496
(58) Field of Search ................................ 426/496, 519, 426/524; 99/348; 366/144, 147

(56) References Cited

U.S. PATENT DOCUMENTS 1,686,967 A * 10/1928 Harber ........................ 99/348
4,323,524 A * 4/1982 Snowden ....................... 264/8

FOREIGN PATENT DOCUMENTS

| JP | 63-103838 | 5/1988 |
|----|-----------|--------|
| JP | 63-160627 | 7/1988 |
| JP | 63-226317 | 9/1988 |

* cited by examiner

*Primary Examiner*—George C. Yeung
(74) *Attorney, Agent, or Firm*—Oblon, Spivak, McClelland, Maier & Neustadt, P.C.

(57) ABSTRACT

A method for controlling the temperature of edible dough to efficiently and promptly control the dough temperature without adversely affecting the working environments, to operate them for a long period of time, and to apply them to any type of a mixer. The method for controlling the temperature of the edible dough during a kneading step includes a step of kneading the edible dough. During the kneading of the edible dough, the method includes a step of introducing a predetermined amount of gas having a predetermined temperature and a predetermined humidity into a mixer. It is preferable that the gas for controlling the temperature of the edible dough has been prepared and kept in advance at a predetermined temperature and humidity, and is then introduced into the mixer on demand. It is also preferable that the gas is circulated and re-used without being discharged out of a system in which the mixer operates.

16 Claims, 2 Drawing Sheets

METHOD FOR CONTROLLING THE TEMPERATURE OF EDIBLE DOUGH DURING KNEADING STEP

TECHNICAL FIELD

Figure 1:
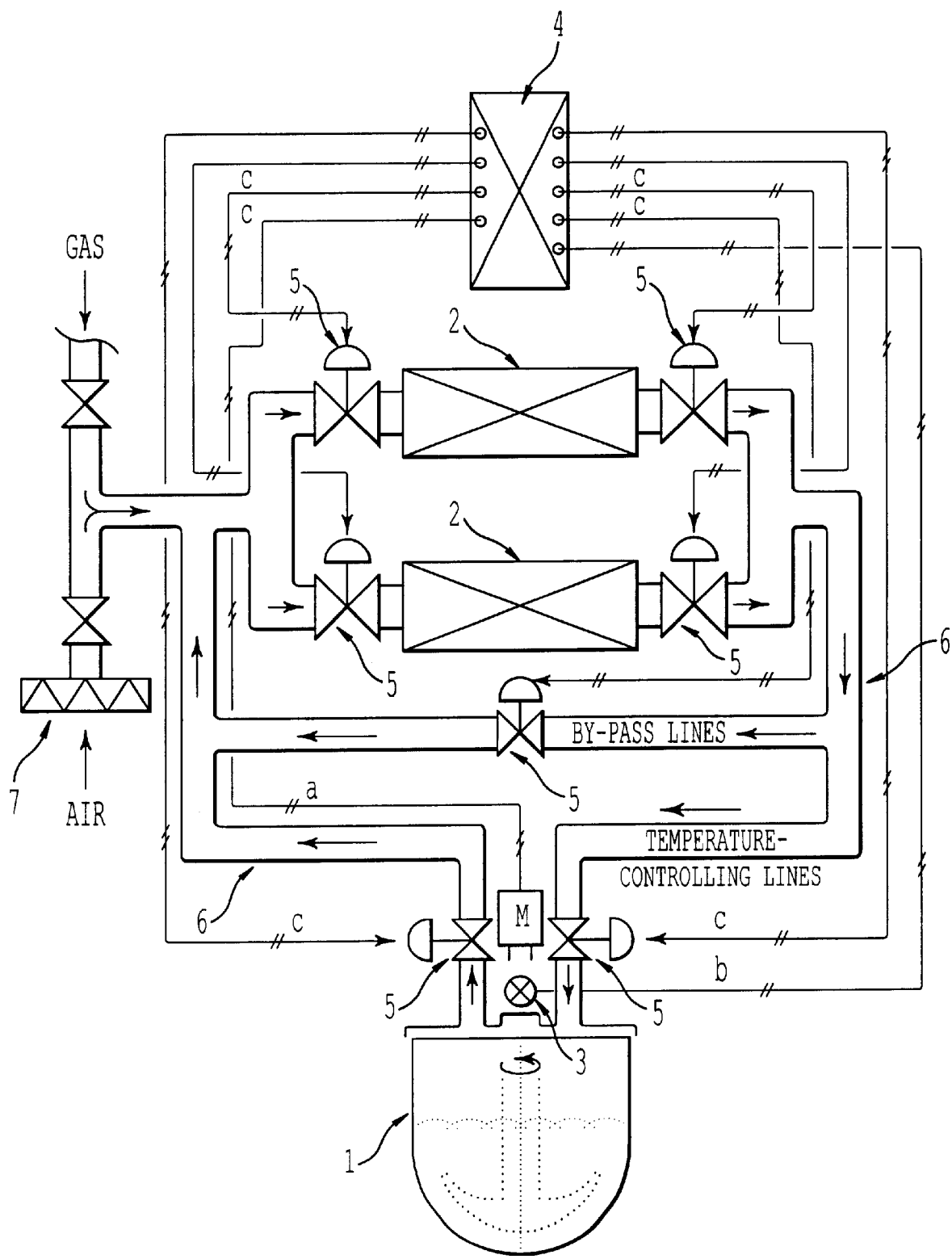

The invention relates to a method for controlling the temperature of edible dough during a kneading step in the making process of bread, confectionery and the like, and to an apparatus used in the above method.

BACKGROUND ART

During the kneading step, it is necessary to mix and knead powder materials such as wheat flour and starch with liquid materials such as water and liquid egg and/or additives such as sugar and salts. This kneading step is usually carried out by means of a mixer or a kneader in an industrial scale. The mixer is composed of a bowl for receiving materials (called also a "dough bowl") and a stirring blade or an impeller for mixing and stirring. There are manufactured many types and structures of the mixer, which are selected and used depending on the properties of products to be prepared.

It is often necessary to control the temperature of dough under kneading in order to equalize and maintain the quality of final products at a certain level, by cooling it down for preventing the overheating due to its friction and hydration, or by heating it for minimizing the effects on the quality of the products due to the fluctuation in the temperature of the materials. Especially, when the dough is kneaded along with its proofing, a strict temperature control is required since the dough temperature will seriously affect the yeast's activity.

The period of time for kneading is important as well. It is well known that the properties of dough such as texture will be affected by the period of time for kneading even if the kneading conditions such as the dough temperature and the stirring strength are kept constantly. As the dough temperature changes, an optimum period of time for kneading will of course have to be changed as well. The change of said time has conventionally been handled by those skilled in the art who are experienced in doing this procedure. However, when the edible dough is produced in a large scale, it will be difficult to change the period of time for kneading depending on the dough temperature according to their experience. Furthermore, the change of the time for kneading in the production of the same item would cause a serious problem in view of a production schedule. Therefore, it is important to control the dough temperature during the kneading step in order to maintain the kneading time, as well.

Japanese Patent Application laid open Sho.61 (1986)-88834 and Japanese Patent Application laid open Sho.59 (1984)-198928 disclose methods for controlling the temperature of edible dough during kneading. In said methods, liquid heating media such as water and antifreezing solution are used to control the dough temperature through the surface of a wall of the dough bowl. As a result, an apparatus for controlling the temperature of the liquid heating media and a thermometer have to be attached to the dough bowl, which will impose a lot of limitation on the structure of the mixer. Those methods have been therefore actually applied only to a particular type of the mixer.

In the method disclosed in Japanese Patent Application laid open Sho.54 (1979)-119051, dry ice is added into the dough under kneading to cool it by heat of sublimation. Although there is no limitation in the structure of the mixer in this method, the scatter of the dry ice to surroundings will seriously affect the working environments. As a result, other devices will have to be installed as a countermeasure against shortage of oxygen gas for the workers in order to improve the working environments.

The French patent application (FR2443206A) discloses a method for controlling the dough temperature using gas such as air, in which a mixer is equipped with a series of temperature-controlling apparatuses (gas-generating apparatuses) that project the gas on to the dough. The apparatuses may be used in any kind of the mixer. However, since humidity of the gas is not controlled, it will be hard to keep the water content in the dough, and the quality or homogeneity of the dough may deteriorate.

The method disclosed in the above French patent application further has the following problems to be solved:

(1) Since it takes some time for the gas to reach a predetermined temperature from the start of controlling the dough temperature, it will be difficult to control the dough temperature in case it changes drastically;

(2) Since the gas (air) is discharged into the surroundings after having been projected on to the dough, heat can not be recovered and the cost for the temperature controlling will become relatively high;

(3) The diffusion of the gas around the mixer will adversely affect the working environments in the surroundings, changing a room temperature, for example; and (4) The temperature-controlling apparatus has to be stopped at a regular interval for defrosting it during a cooling operation, which will make it difficult to operate it for a long period of time.

The purpose of the present invention is therefore to provide a method for controlling the temperature of edible dough under kneading without causing the above problems, and an apparatus that may be used in the above method.

The present inventors have found that it is possible to control the dough temperature by means of the gas such as air without providing the mixer with a special temperature-controlling apparatus. The present invention may be applied to any kind of the mixer.

DISCLOSURE OF THE INVENTION

The present invention relates to a method for controlling the temperature of edible dough during a kneading step, comprising introducing a controlled amount of gas having a controlled temperature and humidity (referred to hereinafter also as the "temperature-controlling gas") into a mixer.

The present invention also relates to an apparatus for controlling the temperature of edible dough that may be used in the present method. The present apparatus comprises an air conditioner that is capable of introducing the controlled amount of gas having a controlled temperature and humidity into the mixer. The present invention further relates to an apparatus for mixing edible dough, comprising the above apparatus for controlling the temperature of edible dough and the mixer. One of its examples is shown in FIG. 1.

In controlling the temperature of edible dough by means of the gas such as air, the humidity of the gas is essential in addition to heat-exchange properties such as its temperature and velocity. The temperature and velocity of the gas will seriously affect the efficiency of controlling the dough temperature. On the other hand, the humidity of the gas will seriously affect the quality of the dough. For example, in case the gas with a relatively low humidity is projected on the edible dough having a high water content, the water content of the dough will be reduced and its quality will deteriorate.

In the present invention, the gas to be used is controlled with respect to not only its temperature but also its humidity so that the quality of the resulting dough may be kept at a constant level. The temperature, velocity and humidity of the gas may be optionally selected by those skilled in the art, depending on the kind and amount of the edible dough, and the conditions during the kneading such as the capacity and operating conditions of the mixer, and a surrounding temperature.

When the edible dough suddenly generates heat during the kneading step, air at a low temperature shall be promptly projected on the surface of the dough and keep its temperature below a certain level in order to control the quality of the dough. However, if the temperature of gas such as air is tried to control just after it has been detected, it will be impossible to respond to a sudden change of the dough temperature.

It is therefore preferable in the present invention that the gas such as air has been prepared and kept in advance at a predetermined temperature and humidity by means of the air conditioner that was started simultaneously with the mixer, and the thus prepared gas is circulated through pipelines without being introduced into the mixer. On demand, the lines are switched by means of a damper, for example, so that the thus controlled gas may be instantly introduced into the mixer. In the present invention, the temperature of the edible dough is maintained at a constant level by rapidly controlling it in response to its sudden change, so that the quality of the final edible dough may be maintained at a desired and constant level.

If the gas or air used in the temperature controlling is discharged into the surroundings, heat can not be recovered and the cost for the temperature controlling will become relatively high.

Accordingly, it is preferable in the present invention to introduce the gas into the air conditioner again without discharging it out of a system, thus to circulate and re-use the gas. As a result, it is possible in the present invention to recover the heat and to reduce the cost for the temperature controlling.

Since the mixing of the edible dough is usually done at a place where people work, the working environments around the apparatuses should be especially taken into consideration. According to the present invention, since the gas used for the temperature controlling is circulated for re-use and is substantially not discharged into the surroundings, the risk of diversely affecting the working environments will be reduced significantly.

The quality of bread and confectionery will deteriorate as time passes away. On the other hand, consumers now strongly require fresh or just-prepared products. As a result, more factories producing such products recently tend to be run around the clock in order to produce the products as frequently as possible. There is no problem with the mixer per se for a 24-hour continuous running. However, it will be necessary to defrost an air-cooling part of the air conditioner at a regular interval to remove the ice accumulated in that part when cooling gas is provided by the air conditioner. Since the air conditioner can not be used during the defrosting procedure, the temperature of the mixer can not be controlled during the defrosting, either. Accordingly, it is preferable in the present invention to use two or more air conditioners so that they can be continuously run around the clock by optionally switching them by means of the damper.

BRIEF DESCRIPTION OF THE DRAEINGS

FIG. 1 Shows a schematic view of one example of the present apparatus.

1: mixer, 2: air-conditioner, 3. thermometer, 4. controlling unit, 5: damper, 6. duct, 7. filter, a. starting signal, b. temperature signal (information), c. damper-switching signal.

Figure 2:
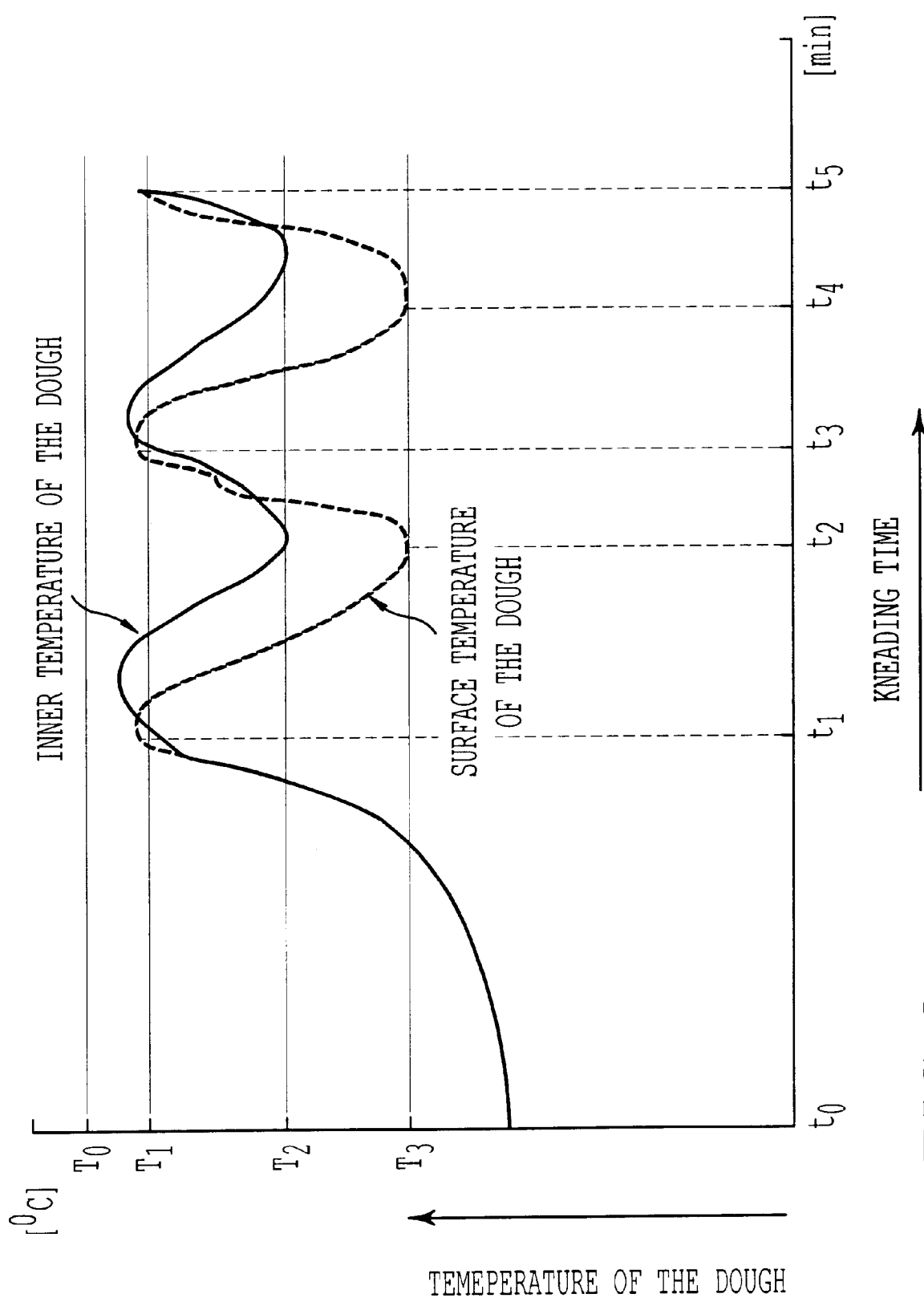

FIG. 2 shows one example of the relationship between the kneading time and the temperatures of dough surface and inside, which is obtained by the temperature controlling according to the present method.

BEST MODE FOR CARRYING OUT THE INVENTION

FIG. 1 shows one example of the preset invention comprising a mixer, two air conditioners that control the temperature and humidity of the gas, and its amount by means of their rotation rates, a sensor for the detection of the inner temperature of the mixer (e.g., a radiant thermometer), duct dampers for the temperature-controlling gas, by-pass lines, an air filter, a controlling unit, and electrical wiring connecting them. Air is usually used as the gas for controlling the dough temperature, but other kinds of gas such as carbon dioxide and nitrogen may be optionally used. There is no limitation in the number of the mixers used in the present invention as long as they may be controlled within the capacity of the air conditioners used in combination with them.

The structures and functions of each element constituting the apparatus of the present invention, for example, those listed above, and connecting ways or modes of the above elements are well known in the art.

Only one air conditioner may be started simultaneously with the mixer, and the temperature-controlling gas is circulated through the by-pass lines without being introduced into the mixer until the gas reaches a predetermined temperature and humidity. In case the difference between the temperature of the gas and that around the mixer is large, the air conditioner may be started earlier than the mixer.

When the temperature of the dough in the mixer reaches a predetermined temperature, the damper will be switched to stop the circulation of the gas through the by-pass lines and to introduce the air into the mixer for controlling the temperature of the dough. Although only the surface of the dough is heated or cooled by means of the temperature-controlling gas, the temperature of the whole dough can become homogeneous in a short period of time by being mixed instantly by means of the impellers. The temperature-controlling gas will be then fed back through the duct to the air conditioner for circulation and re-use.

During the circulation of the temperature-controlling gas through the by-pass lines without being introduced into the mixer, the rotation speed of a fan motor in the air conditioner is set at its minimum level. On the other hand, it may be raised to increase the amount of the gas that is introduced into the mixer, depending on the capacity and numbers of the mixer.

The inner pressure of the mixer may be manually controlled by the damper installed in the middle of the lines. If the difference in pressure between the inside of the mixer and the surroundings is controlled to zero, the discharge of the air out of the system may be substantially prohibited and the operation efficiency will be improved to the best conditions, without adversely affecting the working environments.

The mutual use of two air conditioners makes it possible to continuously operate the apparatus of the present invention in stable conditions the whole day without suspending the apparatus due to, for example, the defrosting during a cooling step. The apparatus according to the present invention is therefore especially advantageous for the continuous production around the clock.

The present apparatus for controlling the temperature of edible dough may be used in combination with any type of the mixer as long as the mixer is provided with three small openings or corresponding spaces for an inlet and outlet for the gas, and the thermometer. Accordingly, the present apparatus may be combined with the conventional mixers having attached thereto a temperature-controlling apparatus for the liquid heating medium and a thermometer.

FIG. 2 shows an example of the relationship between the surface and inner temperatures of the dough, which was obtained in the present method wherein the dough temperature is controlled during the kneading step (from the time "$t_0$" to "$t_5$") while the above temperatures are being detected.

The air conditioner is started simultaneously with the mixer, and the temperature-controlling gas is circulated through the by-pass lines without being introduced into the mixer until the gas reaches a predetermined temperature and humidity. As the dough is mixed, its temperature will increase gradually. The heat that generates due to the stirring will immediately diffuse into the whole dough homogeneously so that the inner and surface temperatures of the dough may be maintained substantially the same with each other. When the surface temperature of the dough reaches $T_1°$ C., the damper is switched so that the temperature-controlling gas may be introduced into the mixer to control the dough temperature("$t_1$" and "$t_3$"). Since the dough is cooled by the air from its surface, the difference in temperature will be caused between the surface and inside of the dough depending on the amounts of the dough and cooling conditions such as the amount of the air. And such difference will be increased gradually until the temperature of the dough surface reaches $T_3°$ C., where the damper is switched to stop the controlling of the temperature("$t_2$" and "$t_4$"). The stirring of the dough will then reduce and finally remove said difference in temperature in a very short period of time, so that both the temperatures reach an intermediate point ($T_2°$ C.) between $T_1°$ C. and $T_3°$ C. Thus, according to the present method, the dough temperature may be maintained substantially between $T_1°$ C. and $T_0°$ C. throughout the kneading step.

When the dough is cooled, the relative humidity of the temperature-controlling gas is usually set at 100% for its temperature unless especially instructed otherwise, so that the water content of the dough may be easily maintained.

Although FIG. 2 represents the case for cooling, the temperature controlling may be carried out with heating according to the present invention.

The temperature curves depicted in FIG. 2 may change depending on the weight and properties of the dough, the degree of stirring power, the capacity of the temperature-controlling, etc. If $T_1°$ C. and $T_3°$ C. are set at appropriately values for a desired finishing temperature of $T_0°$ C., the inner temperature of the dough may be maintained almost the same level as the desired finishing temperature of $T_0°$ C.

The present invention will be further described in more detail, with reference to the following examples which, however, should not be construed to limit the scope of the present invention in any sense.

EXAMPLE 1

The composition of bread dough is shown in Table 1.

TABLE 1

| | | | | | | | |
|---|---|---|---|---|---|---|---|
| | | | (unit:kg) | | | | |
| Wheat Flour | Salt | Sugar | Nonfat Milk Powder | Margarine | Whole Egg | Yeast | Water |
| 58.50 | 1.02 | 7.50 | 1.80 | 8.58 | 12.00 | 3.00 | 22.20 |

Using the apparatus shown in FIG. 1 comprising a mixer having an impeller and bowl that are rotated (a spiral mixer), the dough was kneaded for 3 min at a low rotation speed (the impeller: 80 rpm, the bowl: 8 rpm), and for 9 min at a high rotation speed (the impeller: 160 rpm, the bowl: 16 rpm). The finishing temperature was set at 19° C., and starting temperature (T1° C.) and stopping temperature (T3° C.) for cooling were set at 18° C. and 8° C., respectively. The temperature-controlling air was set at −20° C. and 100% of relative humidity. The ventilation rate was set at 25 m$^3$/min.

Although the dough temperature was not substantially raised during the kneading at the low rotation speed, it reached 18° C. after 4 min from the start of the kneading at the high rotation speed and the cooling with air was started at that point. The start and stop of the cooling were repeated at an interval of about 2 min. The surface temperature and maximum inside temperature of the dough were 17° C. and 19° C., respectively, after the completion of the kneading. Thus, the dough temperature could be maintained almost the same level as the desired finishing temperature of 19° C.

By using the present apparatus for controlling the temperature of the edible dough in combination with the mixer, the bowl of the mixer may be disconnected and movable. As a result, plenty of workloads can be saved at the time of putting the materials and taking out the finished dough. When both the impeller and bowl are rotated during the kneading step, the time for kneading in the present method may be shortened by about 2 min. compared to the conventional ones that use a liquid cooling medium. On the other hand, there are no significant differences between them in the water content of the dough and quality of finally baked products.

When the similar method was carried out without specifically controlling the humidity of the gas (relative humidity: 60%), the water content of the dough product was reduced and the quality of the dough deteriorated.

Advantages of the Invention

The frequency of the production of inferior products due to an inappropriate dough temperature can be reduced according to the present invention, because the accuracy in controlling the dough temperature has been improved. Furthermore, as the temperature controlling gas is circulated and efficiently re-used, the cost for energy can be reduced and the working environments can be maintained in good conditions.

There is no limitation in structure of the mixer that is used in combination with the present apparatus for controlling the temperature of the edible dough. The controlling of the dough can be done in any type of the mixer, and ranges of the choice of the mixer and kneading method are enlarged in the present invention. As a result, it is expected that the efficiency of preparing the dough, the time for kneading and the quality of the dough may be further improved by appropriately selecting the type of the mixer.

What is claimed is:

1. A method for controlling the temperature of edible dough during a kneading step, the method comprising the steps of:

kneading the edible dough; and during the kneading of the edible dough, controlling the temperature of the edible dough by introducing a predetermined amount of gas having a predetermined temperature and a predetermined humidity into a mixer, in which the kneading of the edible dough is being performed, to thereby maintain the temperature of the edible dough at a predetermined constant level and to maintain a water content of the edible dough at a predetermined level, respectively.

2. The method according to claim 1, wherein the gas for controlling the temperature of edible dough has been prepared and kept in advance at the predetermined temperature and the predetermined humidity, before the introducing of the predetermined amount of the gas into the mixer.

3. The method according to claim 1 or 2, wherein the gas is circulated and re-used without being discharged out of a system in which the mixer operates.

4. The method according to claim 1 or 2, wherein the gas is air.

5. The method according to claim 3, wherein the gas is air.

6. A method for controlling the temperature of edible dough during a kneading step, said method comprising the step of:

kneading the edible dough; and controlling the temperature of the edible dough during the kneading of the edible dough by introducing a predetermined amount of gas having a predetermined temperature and a predetermined relative humidity of 100% into a mixer, in which the kneading of the edible dough is being performed, to thereby maintain the temperature of the edible dough at a predetermined constant level and to maintain a water content of the edible dough at a predetermined level, respectively.

7. The method according to claim 6, wherein the gas for controlling the temperature of the edible dough has been prepared and kept in advance at the predetermined temperature and the predetermined humidity, prior to the introducing of the predetermined amount of the gas into the mixer.

8. The method according to claim 6, further including the step of circulating the gas for re-use without letting the gas be discharged out of a system containing the mixer.

9. The method according to claim 7, further including the step of circulating the gas for re-use without letting the gas be discharged out of a system containing the mixer.

10. The method according to claim 6, wherein the gas is air.

11. The method according to claim 7, wherein the gas is air.

12. The method according to claim 8, wherein the gas is air.

13. The method according to claim 6, further comprising the step of controlling the predetermined amount of the gas, the predetermined temperature of the gas, and the predetermined relative humidity of 100% of the gas via an air conditioner.

14. The method according to claim 7, further comprising the step of controlling the predetermined amount of the gas, the predetermined temperature of the gas, and the predetermined relative humidity of 100% of the gas via an air conditioner.

15. The method according to claim 8, further comprising the step of controlling the predetermined amount of the gas, the predetermined temperature of the gas, and the predetermined relative humidity of 100% of the gas via an air conditioner.

16. The method according to claim 9, further comprising the step of controlling the predetermined amount of the gas, the predetermined temperature of the gas, and the predetermined relative humidity of 100% of the gas via an air conditioner.

* * * * *